United States Patent
Hua

(10) Patent No.: US 12,465,951 B2
(45) Date of Patent: Nov. 11, 2025

(54) SORTING METHOD AND GOODS-TO-PERSON SORTING SYSTEM

(71) Applicant: HUAZH Intralogistics Technology Co., Ltd., Nanjing (CN)

(72) Inventor: Juliang Hua, Nanjing (CN)

(73) Assignee: HUAZH Intralogistics Technology Co., Ltd., Nanjing (CN)

(*) Notice: Subject to any disclaimer, the term of this patent is extended or adjusted under 35 U.S.C. 154(b) by 83 days.

(21) Appl. No.: 18/667,890

(22) Filed: May 17, 2024

(65) Prior Publication Data

US 2024/0299985 A1    Sep. 12, 2024

Related U.S. Application Data

(63) Continuation of application No. PCT/CN2023/083587, filed on Mar. 24, 2023.

(30) Foreign Application Priority Data

Feb. 22, 2023    (CN) .................. 202310150305.X

(51) Int. Cl.
| | | |
|---|---|---|
| B65G 47/38 | (2006.01) | |
| B07C 3/08 | (2006.01) | |
| B65G 35/06 | (2006.01) | |

(52) U.S. Cl.
CPC ............ *B07C 3/08* (2013.01); *B65G 35/06* (2013.01); *B65G 47/38* (2013.01)

(58) Field of Classification Search
CPC ............ B07C 3/08; B65G 35/06; B65G 47/38
USPC ....................................... 198/370.03
See application file for complete search history.

(56) References Cited

FOREIGN PATENT DOCUMENTS

| CN | 111760802 | * | 10/2020 | |
|---|---|---|---|---|
| CN | 111776581 A | | 10/2020 | |
| CN | 113460550 A | | 10/2021 | |
| CN | 114829272 A | | 7/2022 | |
| DE | 102022001773 A1 | * | 11/2023 | ............... B07C 3/08 |

* cited by examiner

*Primary Examiner* — Gene O Crawford
*Assistant Examiner* — Lester Rushin, III
(74) *Attorney, Agent, or Firm* — George D. Morgan

(57) ABSTRACT

The present disclosure belongs to the technical field of warehousing and logistics, and provides a sorting method and a goods-to-person sorting system. According to the sorting method and system, order information is acquired and split into order line information, where each of the order line information includes a target commodity, a target sorting quantity and a target source box corresponding to an order line, and then a sorting station, a target rail guided vehicle and a target order container corresponding to each of the order lines are determined according to each of the order line information; and the target commodity is sorted to the target rail guided vehicle from the target source box and conveyed and transferred into the order container by the rail guided vehicle.

13 Claims, 7 Drawing Sheets

SORTING METHOD AND GOODS-TO-PERSON SORTING SYSTEM

CROSS-REFERENCE TO RELATED APPLICATIONS

The application claims priority to Chinese patent application No. 202310150305.X, filed on Feb. 22, 2023, the entire contents of which are incorporated herein by reference.

TECHNICAL FIELD

The present disclosure relates to the technical field of warehousing and logistics, and more particularly relates to a sorting method and a goods-to-person sorting system.

BACKGROUND

In the process of warehousing and logistics management, sorting is an important operation link in a warehouse, with amount of labor used, time consumption, costs and efficiency being of great concern.

"Goods-to-person" is a common sorting way in the field of logistics and warehousing. Generally, it is known that sorting stations are used for sorting on a goods-to-person principle. Goods or articles of an order are conveyed to the corresponding sorting station from a goods shelf in the warehouse according to a preset sequence, and the goods or articles are generally placed into a container; and the goods or articles are taken out of the storage container and placed into an order container. This process is generally repeated until the corresponding order or corresponding order container is processed at the sorting station, and then sorting for the next order or next order container is processed. Firstly, whether the preset storage container and order container arrive at corresponding sorting station positions needs to be determined, and then sorting is completed, to complete the sorting for one order or one order container. This sorting way taking the container as a sorting unit has strong coupling, relatively low efficiency, high time consumption and high costs; in addition, manual and robotic arms are limited in length, and generally only articles within a certain range near a particular work station may be sorted without moving themselves, so that the quantity of the order containers may often only be 2-3; although aiming at the problems of limited sorting range and small quantity of order boxes, some improved products also appear on the market, for example, the Chinese patent document with the patent quantity of CN104907258B, entitled "PACKAGE SORTING SYSTEM AND INFORMATION ACQUISITION METHOD", discloses a package sorting system, and the technical solution thereof discloses that "the system further includes a plurality of mobile transportation devices, each of which is used for loading one package to be conveyed or a plurality of packages to be conveyed with the same destination, and the mobile transportation devices convey the packages to be transported to a package inspection outlet corresponding to the destination of the packages to be conveyed", and even if in the sorting way in which the mobile transportation devices are adopted for transfer transportation, the mobile transportation devices also need to complete the tasks of loading, transportation and unloading, so that the degree of efficiency improvement is limited, and the sorting requirements of high frequency and short time limit still may not be met; moreover, the present disclosure of the plurality of mobile transportation devices also greatly increases the cost input of the system; and the simultaneous operation of the plurality of mobile transportation devices also presents significant challenges to the path planning technology.

The technical problems to be solved by the present patent are as follows: how to achieve weak coupling between orders and between order lines in a sorting process for order sorting, and improve the efficiency, as well as how to solve the problems of limited sorting range and small quantity of order containers at low costs.

SUMMARY

It is an objective of the present disclosure to provide a sorting method and a goods-to-person sorting system which realize sorting by taking an order line (category) as a sorting unit, thereby achieving weak coupling between orders and between order lines in a sorting process for order sorting, and improving the efficiency.

The technical solution adopted by the present disclosure is as follows: a sorting method based on a goods-to-person sorting system, the sorting method including:
  acquiring order information and splitting the order information into a plurality of order line information, each of the order line information including a target commodity, a target sorting quantity and a target source box corresponding to an order line, and each of the order lines including one or more types of target commodities as well as a target sorting quantity and a target source box of each of the target commodities;
  matching a target sorting station, a target rail guided vehicle and a target order container corresponding to each of the order lines according to each of the order line information; and configuring the target source box to be conveyed to the corresponding target sorting station from an external storage area by using a supply conveyor line; and
  configuring the target commodities to be sorted to the target rail guided vehicle from the target source box; and
  configuring the target commodities to be conveyed and transferred into the target order container by using the target rail guided vehicle;
  where the goods-to-person sorting system includes the supply conveyor line connected to the external storage area, at least one target sorting station, at least one target rail guided vehicle, a target conveyor rail on which each of the target rail guided vehicles travels, and at least one target order container.

In this technical solution, the order information is matched to the order line information by taking the target commodity as a basis for determination, and one or more order information is acquired according to batches and split into order line information.

In this technical solution, when the order information is split, a certain target commodity quantity of the current order line information is acquired, and whether the current target commodity quantity of the order line information exceeds the target commodity quantity in the target source box is determined;
  if so, target commodity-related information is split into new order line information; and
  if not, the target commodity-related information is added to the order line information.

In this technical solution, when the supply conveyor line is annularly arranged, and a plurality of target sorting stations are arranged, after each order line completes a sorting task of the target sorting station thereof, whether the target source box has the sorting task of other target sorting stations is determined;

if so, the target source box is output into the supply conveyor line for conveying for other corresponding target sorting stations to sort; and if not, the sorting task of the target source box is ended.

In this technical solution, the goods-to-person sorting system is further configured with a delivery conveyor line, the target commodity is conveyed and transferred into the target order container by the target rail guided vehicle, and the steps of conveying and transferring include:

conveying and transferring the target commodity to the delivery conveyor line by the target rail guided vehicle; and conveying and transferring the target commodity into the target order container by the delivery conveyor line.

In this technical solution, the target commodities of all order lines of each of the order information correspond to one order line conveyor line; where a plurality of order line conveyor lines are configured on the delivery conveyor line in parallel, and the corresponding order line conveyor lines are determined according to order information; and each of the order line conveyor lines corresponds to one or more order containers, and the one or more order containers corresponding to each of the order lines are determined according to each of the order line information.

In this technical solution, a guided vehicle buffering platform is further arranged on the conveyor rail, when the target rail guided vehicle needs to avoid other rail guided vehicles during traveling on the conveyor rail, the target rail guided vehicle is buffered at the guided vehicle buffering platform.

A goods-to-person sorting system includes a supply conveyor line connected to an external storage area, at least one target sorting station, at least one target order container, and a control device, where the goods-to-person sorting system further includes:

at least one target rail guided vehicle, the target rail guided vehicle being configured with a target conveyor rail on which the target rail guided vehicle travels, and the target conveyor rail being provided with a goods receiving position and a goods unloading position, and the target rail guided vehicle being used for bearing target commodities sorted from the sorting station at the goods receiving position and also used for unloading the borne target commodities into the target order container at the goods unloading position; and a target source box, the target source box being used for being conveyed to the sorting station for sorting from the external storage area through the supply conveyor line, and the supply conveyor line being communicated with the sorting station;

where the control device is used for acquiring order information and processing the order information into order line information, the control device is used for determining a target rail guided vehicle, a target sorting station and a target order container corresponding to each of the target source boxes according to each of the order line information, the control device is also used for sending the order line information to the target sorting station, and the control device is used for controlling the supply conveyor line and the target rail guided vehicle to transport the target commodities into the corresponding target order container; and each of the order line information includes a target commodity, a target sorting quantity and a target source box corresponding to an order line, and each of the order lines includes one or more types of target commodities and a target sorting quantity and a target source box of each of the target commodities.

In this technical solution, the goods-to-person sorting system further has a delivery conveyor line; and the delivery conveyor line has a first end communicated with a conveyor rail of the target rail guided vehicle, the delivery conveyor line further has a second end arranged above an inlet of the target order container, and the delivery conveyor line is used for conveying and transferring the target commodity into the target order container by the target rail guided vehicle corresponding to the target commodity.

In this technical solution, the delivery conveyor line comprises a plurality of order line conveyor lines arranged in parallel; and commodities of all order lines of one order correspond to one of the order line conveyor lines, and each of the order line conveyor lines is configured with one or more order containers.

In this technical solution, the delivery conveyor line comprises a main delivery conveyor line and a commodity buffering line;

the main delivery conveyor line is used for receiving the target commodity unloaded by the target rail guided vehicle, and conveying the target commodity into the target order container; and the commodity buffering line is of an arc-shaped structure, and two ends of the arc-shaped structure are both communicated with the main delivery conveyor line.

In this technical solution, a tray flipping device is arranged at a top of the target rail guided vehicle; and the tray flipping device has a horizontal goods receiving position and an inclined goods unloading position, and the tray flipping device is switched between the horizontal goods receiving position and the inclined unloading position to receive the target commodity sorted from the sorting station or unload the target commodity into the target order container or delivery conveyor line.

Compared with the prior art, the present disclosure has the following significant advantages.

1. The order information is split into a plurality of order line information, subsequently a target sorting station, a target rail guided vehicle and a target order container corresponding to each of the order lines are matched according to each of the order line information, and then the target commodity is sorted into the corresponding target order container thereof and conveyed to the corresponding target sorting station thereof by means of the target rail guided vehicle, to realize sorting by taking the order line (category) as a sorting unit, thereby achieving weak coupling between orders and between order lines in a sorting process for order sorting, improving the efficiency, and reducing the labor intensity; in addition, by arranging the target rail guided vehicle, the problems of limited sorting range and small quantity of target order containers are also solved, the function of being capable of configuring a plurality of order boxes (namely, target source boxes) is achieved, the sorting requirements of high frequency and short time limit may be met, the efficiency is greatly improved, and the sorting costs and equipment input costs are reduced.

2. A certain target commodity quantity of the current order line information is acquired, and whether the current target commodity quantity of the order line information exceeds the target commodity quantity in the target source box is determined, if so, the order line information is split into new order line information; and if not, the order line information is added to the current order line information, to update each of the order line information timely, and normal sorting is performed according to the updated order line information, to achieve automatic and efficient splitting of the order lines.

3. A plurality of order line conveyor lines configured on the delivery conveyor line in parallel improve the transfer efficiency of the target rail guided vehicle.

In conclusion, the sorting method and the goods-to-person sorting system of the present disclosure realize sorting by taking the order line (category) as a sorting unit, thereby achieving weak coupling between orders and between order lines in a sorting process, as well as weak coupling between orders and between order lines in the sorting process for order sorting, improving the efficiency, and reducing the labor intensity.

DETAILED DESCRIPTION OF THE EMBODIMENTS

In order to better understand the technical content of the present disclosure, specific embodiments are described below with reference to the accompanying drawings.

Aspects of the present disclosure are described in the present disclosure with reference to the drawings, in which a number of illustrative embodiments are shown. The embodiments of the present disclosure are not necessarily intended to include all aspects of the present disclosure. It should be understood that the various concepts and embodiments described above, as well as those concepts and implementations described in greater detail below, can be implemented in any of numerous ways, as the concepts and embodiments disclosed herein are not limited to any implementation. Additionally, some aspects of the present disclosure can be used alone or in any suitable combination with other aspects of the present disclosure.

The existing conventional sorting methods are mostly applied to a single-layer or multi-layer sorting station 1 (such as a dual sorting station 8 in FIG. 7), and the method of sorting using a container as a sorting unit has strong coupling, low efficiency, long time consumption and high cost; a human being and a robot are located on relatively fixed work stations for sorting; since the length of the arms of the human being and the robot are limited, in general, only articles in a certain range near the work stations can be sorted without moving the human being and the robot themselves, and therefore the quantity of the order boxes (i.e., the source box described in this patent) is often limited, may often only be 2-3; even though some robots themselves may move to perform more order box sorting operations, movement may result in less efficient sorting operations.

To solve the aforementioned problems of limited quantity of order boxes and reduced coupling, the present disclosure proposes a sorting method applied to a goods-to-person sorting system. The aforementioned goods-to-person sorting system changes the layout of a conventional sorting station, and based on this sorting system layout, the present disclosure firstly proposes a sorting method which realize sorting by taking an order line (category) as a sorting unit to achieve the technical effect of reducing coupling and achieving sorting with high efficiency, and solves the problems of a limited quantity of order boxes, a sorting operation being limited by the length of an arm of a human being or a robot by providing a target rail guided vehicle, and the problem of the target rail guided vehicle not needing to consider path planning, etc. compared with a none-rail guided vehicle, thereby reducing research and development costs.

Embodiment 1

Figure 1:
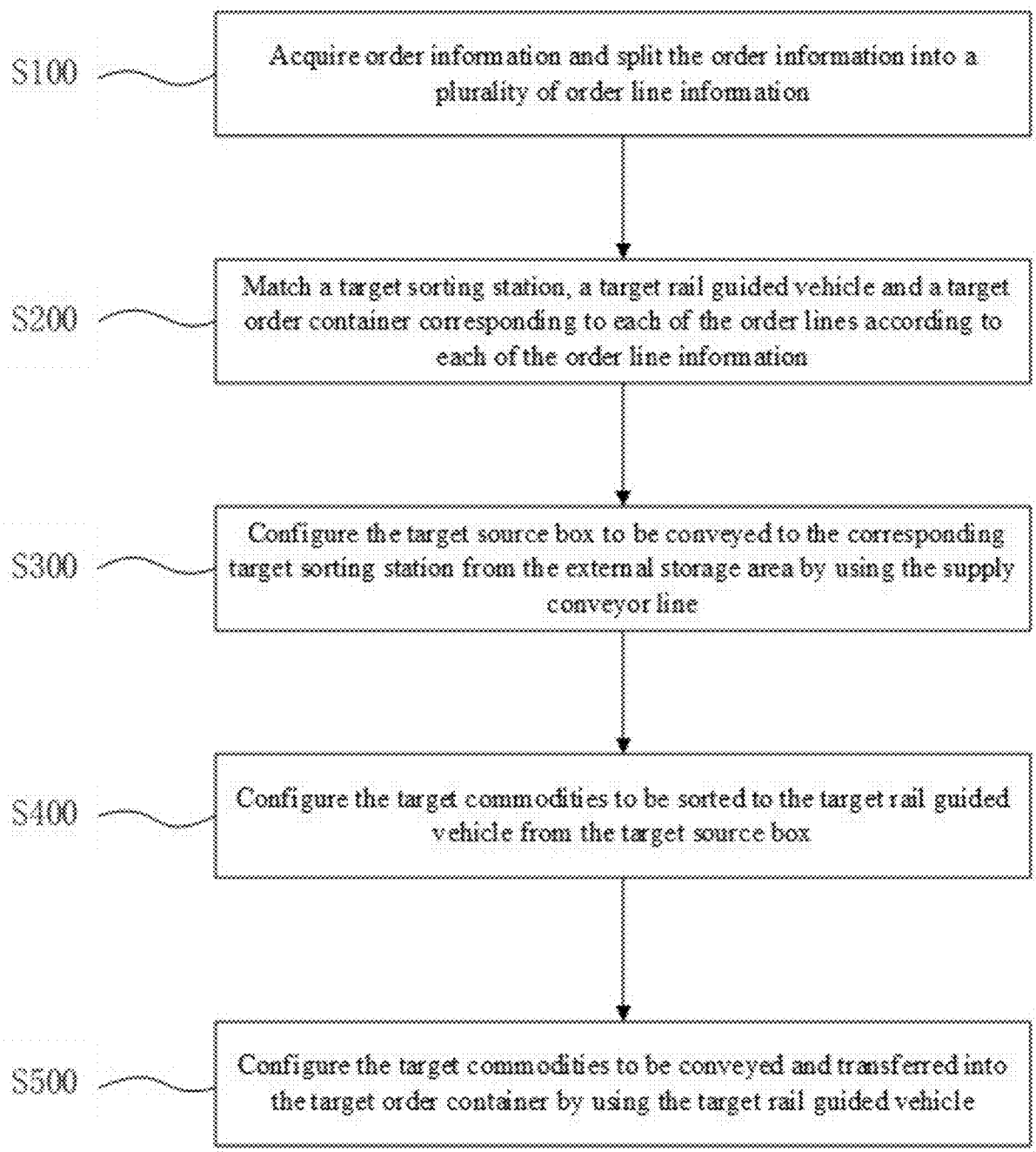
FIG. 1 is a schematic flow diagram showing a sorting method according to a preferred embodiment of the present disclosure.

The sorting method as shown in FIG. 1 is applied to a goods-to-person sorting system of a stereoscopic warehouse.

Figure 4:
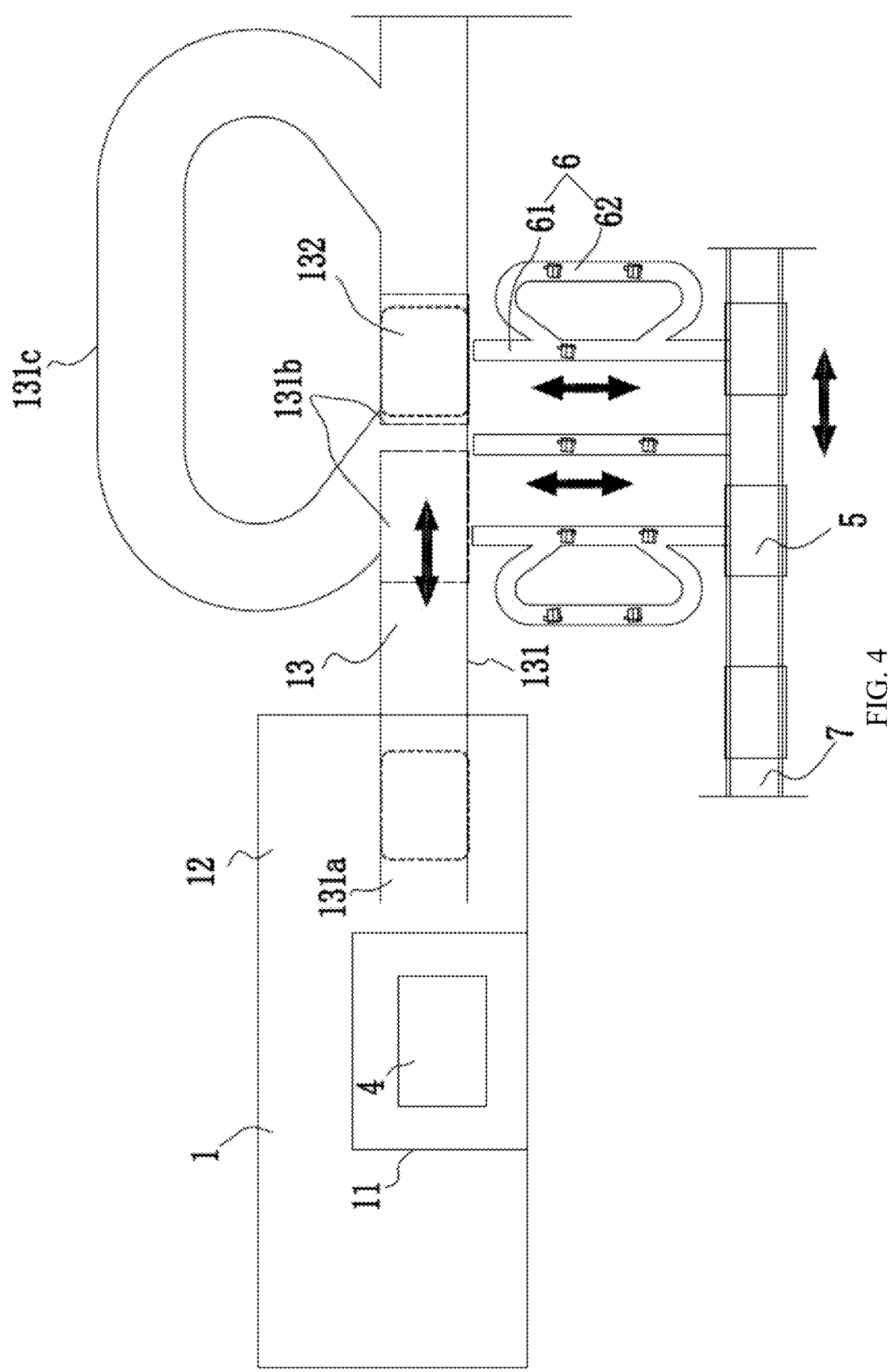
FIG. 4 is a schematic diagram showing layout of a sorting system according to a preferred embodiment of the present disclosure.

The sorting method is used in the goods-to-person sorting system of the embodiment shown in FIG. 4, which includes a supply conveyor line 2 (such as a roller conveyor) connected to an external storage area, a target sorting station 1, a target rail guided vehicle, a conveyor rail 131 for the target rail guided vehicle 132 to travel, a target order container 5, and a control device (not shown).

Figure 6:
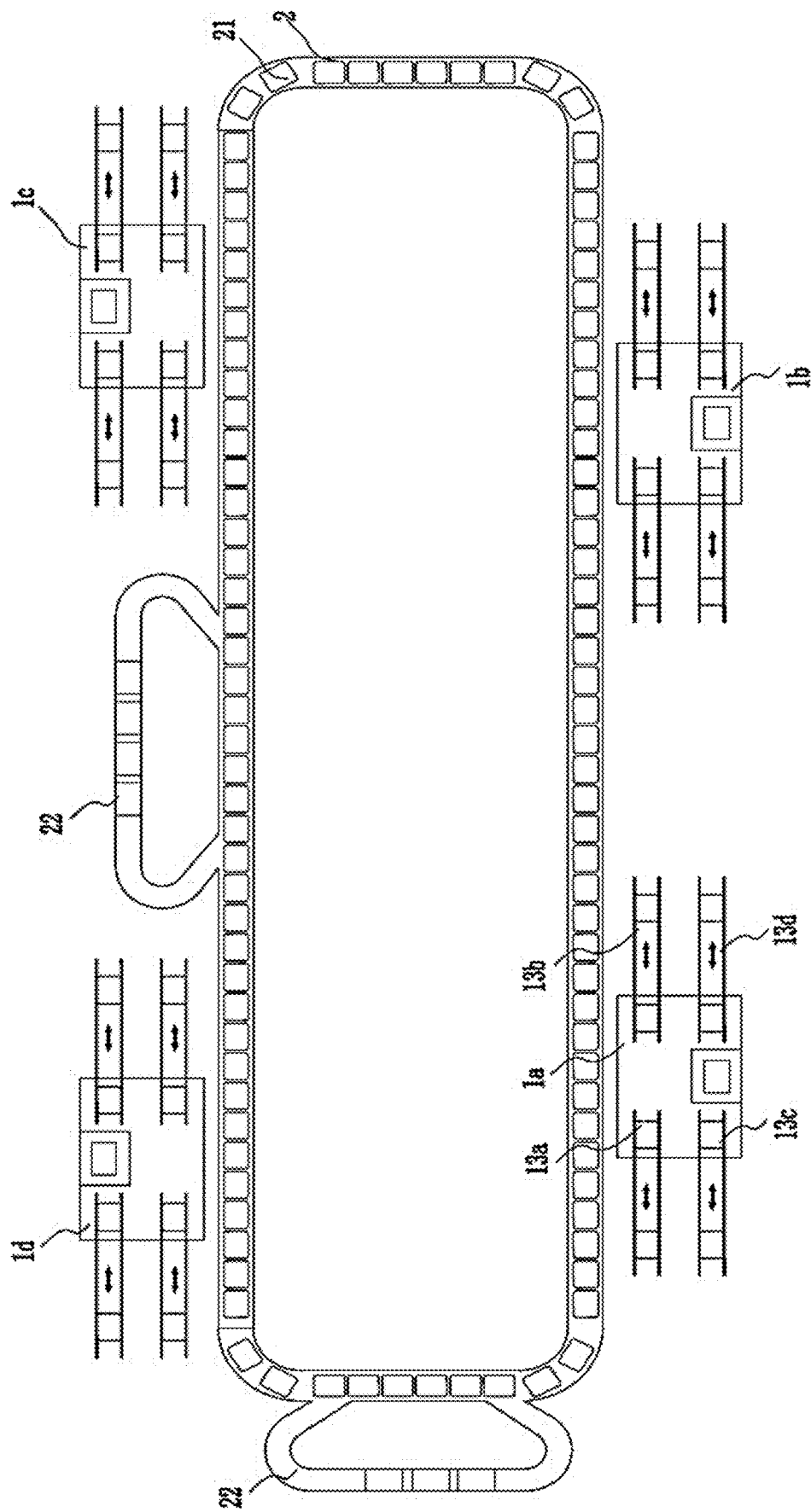
FIG. 6 is a schematic diagram showing layout of a sorting system according to another preferred embodiment of the present disclosure.

Or it is used in the goods-to-person sorting system of the embodiment shown in FIG. 6, the goods-to-person sorting system shown in FIG. 6 further has a plurality of target sorting stations: a first target sorting station 1a, a second target sorting station 1b, a third target sorting station 1c, a fourth target sorting station 1d, and has a plurality of target rail guided vehicles: a first target rail guided vehicle 13a, a second target rail guided vehicle 13b, a third target rail guided vehicle 13c, and a fourth target rail guided vehicle 13d. The control device communicates with the supply conveyor line 2, the target rail guided vehicle 132 and one or more target sorting stations 1, respectively. The supply conveyor line 2 is used to convey the target source boxes 4 from the external storage area to the target sorting station 1. The height of the target sorting station 1 is generally ergonomically configured for taking out the target commodity 3 from the target source box 4 and placing the commodity onto the target rail guided vehicle 132.

The target rail guided vehicle 132 has a goods receiving position 131a and a goods unloading position 131b arranged on the conveyor rail 131, and the target rail guided vehicle 132 is a bidirectional or four-way or four-way climbable rail guided vehicle (the bidirectional or four-way or four-way climbable rail guided vehicle is well known in the art, and any suitable structure existing or developed in the future can be used according to disclosure of the present disclosure.) for bearing and transporting the target commodity 3.

Figure 5:
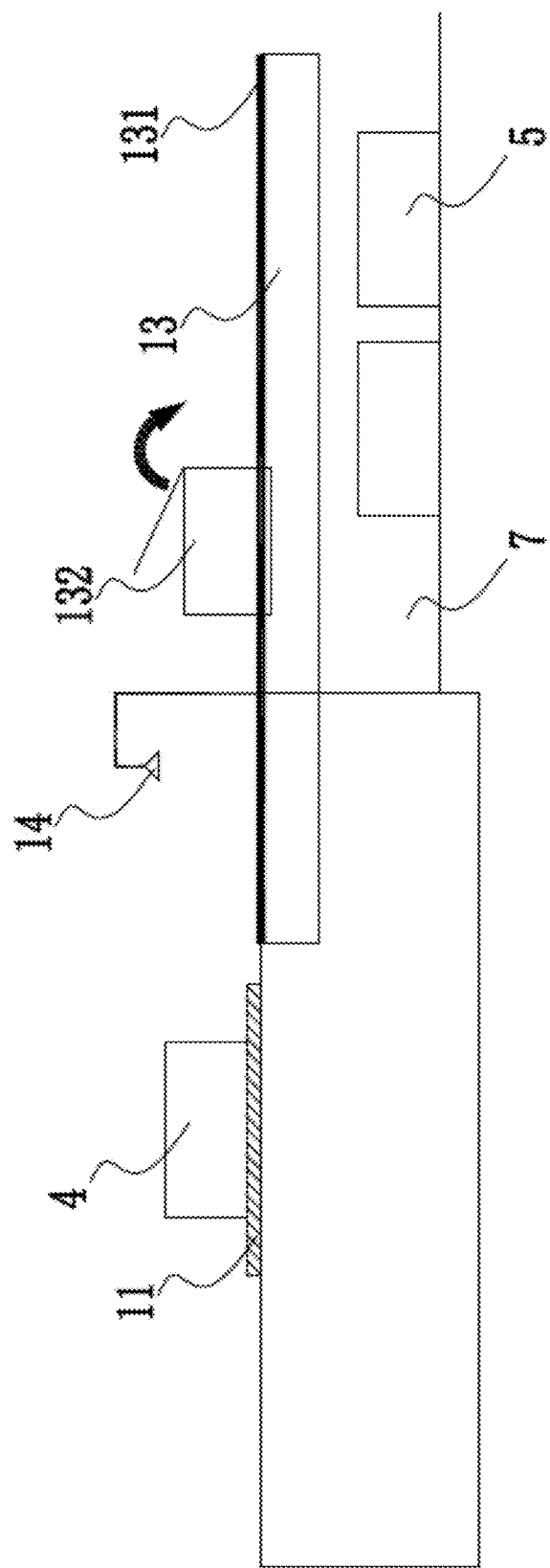
FIG. 5 is a schematic structural diagram showing a sorting system according to a preferred embodiment of the present disclosure.

As shown in FIGS. 4 and 5 in conjunction with FIG. 6, each target sorting station 1 is adjacent to a goods receiving position 131a on the conveyor rail 131 of the target rail guided vehicle 132. Each target sorting station 1 corresponds to one or more goods receiving positions 131*a*. The target order container 5 is adjacent the goods unloading position of the target rail guided vehicle 132 (in certain embodiments, as shown in FIG. 4, the target order container 5 is provided below the conveyor rail 131) and enables the transfer of the target commodity 3 from the target rail guided vehicle 132 into the target order container 5. The conveyor rail 131 includes a straight conveying section and/or an arc conveying section, and the target rail guided vehicle 132 can travel along the conveyor rail 131 to reach its goods receiving position corresponding to each sorting station 1 and its goods unloading position corresponding to each target order container 5, namely, the rail guided vehicle 132 can receive commodities from the goods receiving positions of different target sorting stations 1 and convey these commodities to the target order containers 5 or different target order containers 5.

Based on the aforementioned goods-to-person sorting system, as shown in FIGS. 1 to 4, the sorting method includes:

S100: order information is acquired and the order information is split into a plurality of order line information;

S200: a target sorting station, a target rail guided vehicle and a target order container corresponding to each of the order lines are matched according to each of the order line information;

S300: the target source box is configured to be conveyed to the corresponding target sorting station from the external storage area by using the supply conveyor line;

S400: the target commodities are configured to be sorted to the target rail guided vehicle from the target source box; and S500: the target commodities are configured to be conveyed and transferred into the target order container by using the target rail guided vehicle.

According to the method, one or more order information is acquired according to batches and split into order line information, e.g. one order is split into 5 No. 1 commodities, 18 No. 2 commodities and 8 No. 3 commodities. For example, a plurality of orders (10 orders) of the current batch are split into 50 No. 1 commodities, 180 No. 2 commodities and 80 No. 3 commodities; namely, one order line corresponds to a target commodity 3 of a certain category of one or more orders; further, the target commodities 3 of the same category may also correspond to one order line or a plurality of order lines; for example, when the quantity of target commodities 3 of this category is relatively large (500), the target commodities 3 may be stored in different target source boxes 4, then the target commodities 3 of the same category may also correspond to a plurality of order lines; and a person skilled in the art would have been able to adjust the splitting strategy according to actual situations. The aforementioned current batch can be divided according to the quantity of orders (for example, 100 orders are divided into one batch), the order time (for example, the order within one hour is divided into one batch) and the order priority level (for example, the order with the same order priority level is divided into one batch). The aforementioned division of the current batch of orders is merely an example, and the division of the batch of orders is not limited to three modes according to the quantity of orders, the order time and the order priority level. The order line information includes a target commodity 3 corresponding to each order line of the current order (e.g., No. 3 commodities corresponding to No. 1 order line), sorting quantity of the aforementioned target commodity 3 (e.g., 8 No. 3 commodities or 80 No. 3 commodities), and a target source box 4 (e.g., No. 4 source box) corresponding to the target commodity 3.

Figure 2:
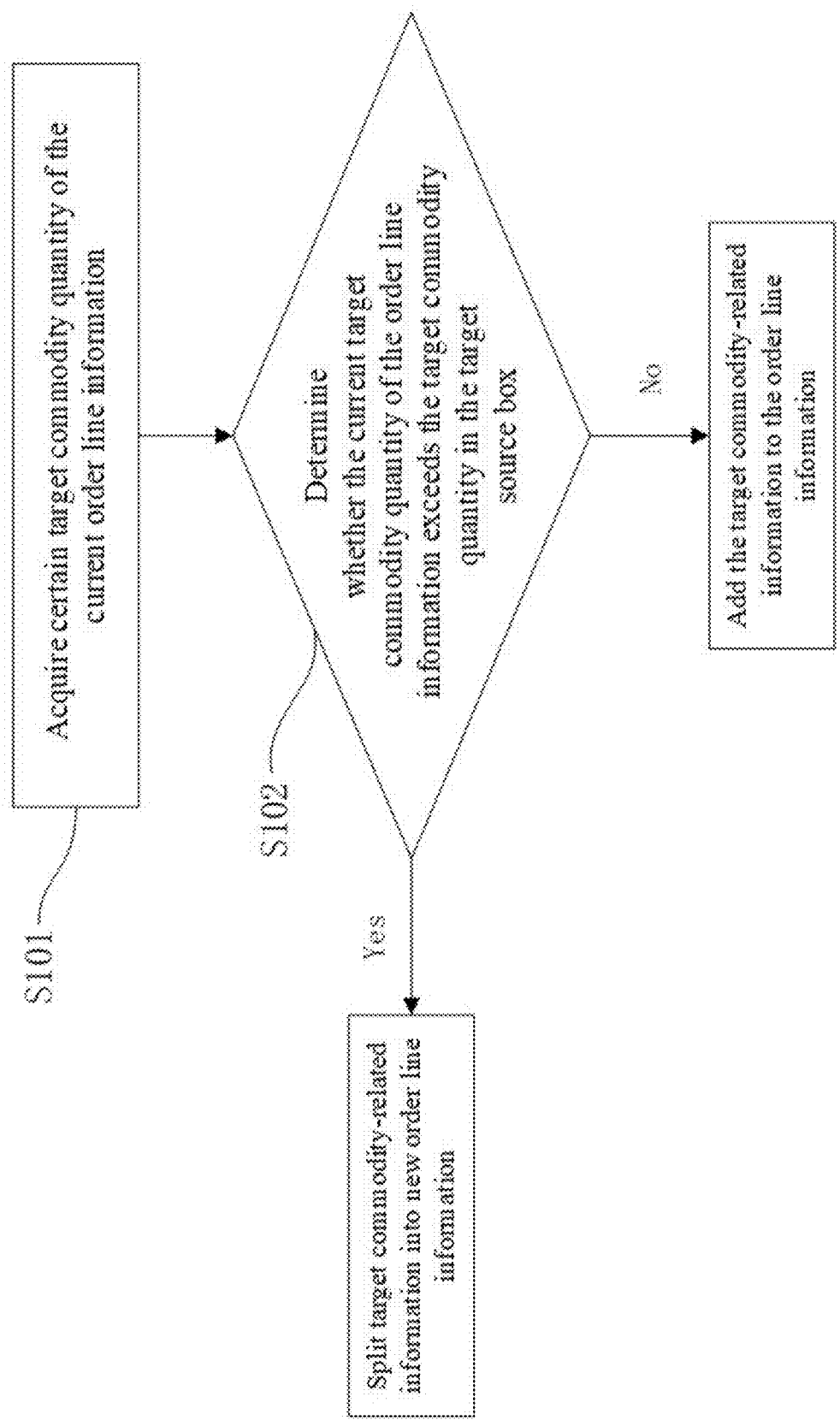
FIG. 2 is a flow diagram showing processing of a target source box being completed when each order line completes its sorting task at the target sorting station.

The aforementioned order information is executed according to step S101 and step S102 shown in FIG. 2 when splitting and updating are performed during the splitting process, where S101: a certain target commodity quantity of the current order line information is acquired; S102: whether the current target commodity quantity of the order line information exceeds the target commodity quantity in the target source box is determined; if so, the target commodity-related information is split into new order line information; if not, the target commodity-related information is added to the order line information.

When the above embodiment is executed, a target sorting station 1, a target rail guided vehicle 132 and a target order container 5 corresponding to each order line is determined according to each order line information. The target sorting stations 1 are generally allocated on an idle basis. An empty target rail guided vehicle 132 is generally determined to be a target rail guided vehicle according to the proximity principle, and a target rail guided vehicle 132 may correspond to an order line or a plurality of order lines. Each target order container 5 has a unique container number. According to the volume, quantity, shape and material of each order, the control device determines that the order corresponds to one or more target order containers 5. If the order corresponds to a target order container 5, then the container is a target order container; if the order corresponds to a plurality of order containers, then each order line is allocated a suitable order container of the aforementioned plurality of order containers according to the quantity, volume, shape and material of each order line; it should be understood that one or more order lines may be allocated the same or different target order containers 5; if a certain order line corresponds to a plurality of orders, then the order line will allocate different target order containers 5, for example, 80 No. 3 commodities of 3 orders are allocated in at least 3 different containers; in addition, for example, 80 No. 3 commodities of an order may be allocated in one or more containers according to quantity, volume, shape and material; for another example, 8 No. 3 commodities and 5 No. 7 commodities of an order can be allocated in the same target order container 5, and a person skilled in the art would have been able to adjust the allocation strategy according to actual situations.

In this embodiment, the target source boxes 4 are conveyed by the supply conveyor line 2 from an external storage area to the corresponding target sorting station 1. The target sorting station 1 displays the corresponding order line information, and the operator (human being or robot) operates according to the displayed information of the sorting station 1.

In this embodiment, the target commodities 3 are sorted from the target source boxes 4 to the corresponding target rail guided vehicles 132. In this embodiment, a tray flipping device 1321 is arranged at a top of the target rail guided vehicle 132. The tray flipping device 1321 has a horizontal goods receiving position, the horizontal goods receiving position is lower than the conveyor line outlet, and the inclined goods unloading position is higher than the target order container 5. The tray flipping device 1321 switches between the horizontal goods receiving position and the inclined goods unloading position to receive or unload the target commodities 3 conveyed at the conveyor line outlet into the target order container 5.

In other embodiments, a delivery conveyor line 6 is provided between the goods unloading position and the order container 5, the delivery conveyor line 6 is higher than the order container 5 outlet, and the delivery conveyor line 6 is used for conveying the target commodities 3. The flipping direction of the tray flipping device 1321 is not limited in this patent and may be flipped forward or backward or both. It should be understood that the aforementioned tray flipping device 1321 is well known in the art, and any suitable structure existing or developed in the future can be used according to disclosure of the present disclosure. Of course, the rail guided vehicle 132 may have other structures and forms, such as a horizontal convey device (belt, roller conveyor, etc.) as long as it can bear and unload goods, and is not limited to the structure disclosed in the present disclosure.

In this embodiment, the target commodities 3 are conveyed by the rail guided vehicle 132 and transferred directly or indirectly into the target order container 5. It should be noted that if only one order corresponds to one order, the target rail guided vehicle 132 is controlled by the control device to convey the target commodities 3 directly or indirectly into one or more order containers 5 corresponding to the order; if a plurality of pieces of order information are acquired according to batches and the plurality of pieces of order information are split into order line information, namely, one order line corresponds to a target commodity 3 of the same category of a plurality of orders, for example, the plurality of orders of the current batch are split into 50 No. 1 commodities (for example, No. 1 order among the 3 orders includes 30 No. 1 commodities, and No. 2 order includes 20 No. 1 commodities), 180 No. 2 commodities and 80 No. 3 commodities, then 30 commodities 3 of the 50 No. 1 commodities are conveyed by a target rail guided vehicle 132 and directly transferred or indirectly transferred into one or more order containers 5 corresponding to No. 1 order; of the 50 No. 1 commodities, 20 commodities 3 are conveyed by the target rail guided vehicle 132 and transferred directly or indirectly into one or more target order containers 5 corresponding to No. 2 order. In these embodiments, the target rail guided vehicle 132 generally employs a horizontal convey device to facilitate unloading of a specified quantity of target commodities 3.

Figure 3:
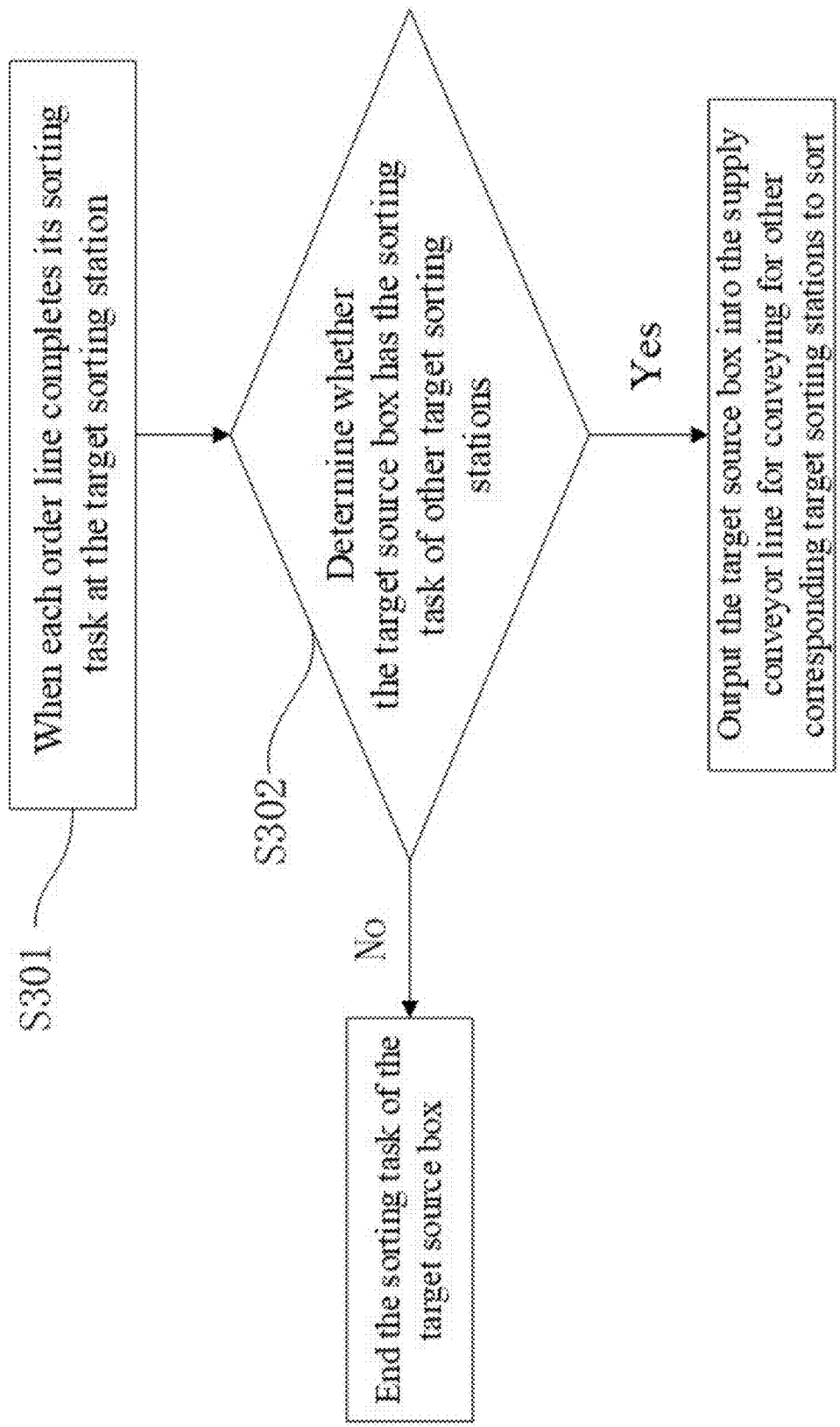
FIG. 3 is a flow diagram showing split of the order information in one embodiment.

The aforementioned target commodities 3 are conveyed by the target rail guided vehicle 132 and directly transferred into the target order container 5, which means that: as shown in FIG. 4, the target commodities 3 are unloaded directly from the target rail guided vehicle 132 to the target order container 5. The aforementioned target commodities 3 are conveyed by the target rail guided vehicle 132 and are indirectly transferred into the target order container 5, which means that: as shown in FIG. 3, in some embodiments where a delivery conveyor line 6 is provided between the goods unloading position and the target order container 5, the target commodities 3 are unloaded from the target rail guided vehicle 132 onto the delivery conveyor line 6 which delivers the commodities into the target order container 5. To this end, the sorting task of the order line is completed, and when the sorting tasks of all the order lines of the order are completed, the order sorting task is completed.

As such, the sorting method disclosed in the present disclosure is used to realize sorting by taking the order line (category) as a sorting unit, thereby achieving weak coupling between orders and between order lines in a sorting process for order sorting, improving the sorting efficiency; the problems of limited sorting range and small quantity of target order containers are also solved, the function of being capable of configuring a plurality of order boxes is achieved, the sorting requirements of high frequency and short time limit may be met, the efficiency is greatly improved, and the sorting costs and equipment input costs are reduced.

In some embodiments, as shown in FIG. 3, the aforementioned sorting system also has a delivery conveyor line 6, and the conveying and transferring of the target commodities 3 into the order container 5 by the rail guided vehicle 132 includes: the target commodities 3 are conveyed and transferred by the rail guided vehicle 132 to the delivery conveyor line 6. The target commodities 3 are conveyed and transferred by the delivery conveyor line 6 into the target order container.

Figure 7:
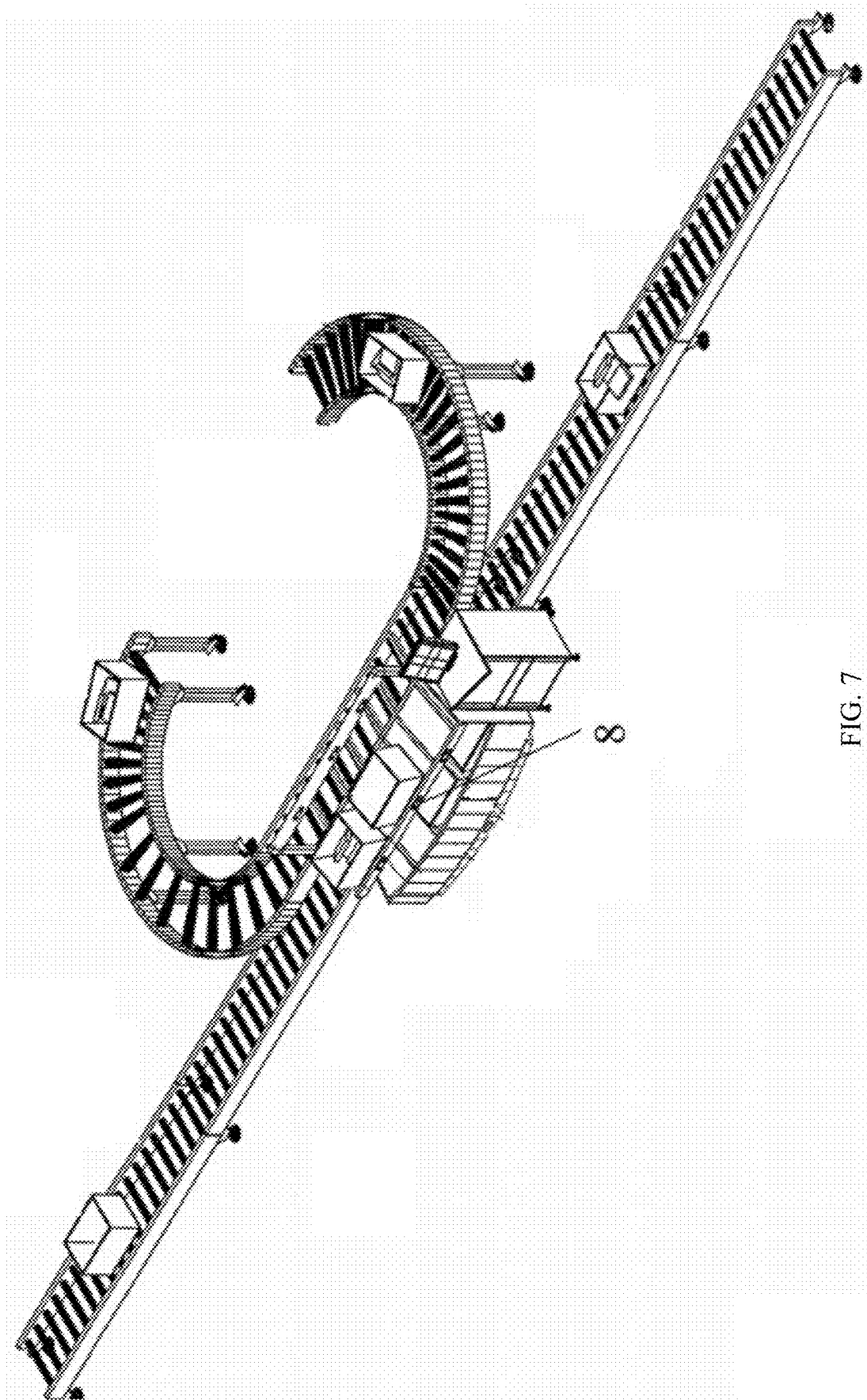
FIG. 7 is a schematic structural diagram showing a prior art dual level sorting station in the prior art.

As shown in FIG. 5, the delivery conveyor line 6 includes a plurality of order line conveyor lines 61 arranged in parallel; all order line commodities of an order correspond to an order line conveyor line (for example, 5 No. 1 commodities, 18 No. 2 commodities and 8 No. 3 commodities of the aforementioned order all correspond to the same conveyor line, i.e., one order corresponds to an order line conveyor line), and one order line conveyor line corresponds to one or more target order containers 5, as such, an order line of an order can be sorted at different or the same target sorting stations 1, and then conveyed to an order line conveyor line by different or the same target rail guided vehicles 132; the target rail guided vehicle 132 can also receive target commodities of order lines of different orders from different or the same sorting station 1 and convey same to different order line conveyor lines; the dual sorting station 8 of the conventional art, as shown in FIG. 7, has to sort one by one in order of an order, causing a strong coupling problem, and the sorting system proposed by the present disclosure greatly reduces the coupling among a plurality of orders or a plurality of order lines, improving the sorting efficiency.

The target order container 5 of the present disclosure may be manually conveyed to a position where it is docked with the order line conveyor line, or may be automatically conveyed to a position where it is docked with the order line conveyor line 61 via a conveyor line 7. The aforementioned sorting method further includes: a corresponding order line conveyor line is determined according to the order information; according to each order line information, one or more order containers 5 corresponding to each order line are determined.

In some embodiments, the order line conveyor line 61 is further provided with a commodity buffering line 62, an inlet and an outlet of the commodity buffering line 62 are respectively communicated with the order line conveyor line 61, and the commodity buffering line 62 is used for buffering the target commodities 3, and if the target order container 5 corresponding to the target commodity 3 does not reach the position where the target order container 5 is docked with the order line conveyor line 61, the target commodities 3 are temporarily input to the commodity buffering line 62 for buffering, and after the target order container 5 reaches the position where the target order container 5 is docked with the order line conveyor line, the target order container 5 returns to the order line conveyor line and is conveyed into the target order container 5.

In some embodiments, as shown in FIGS. 4-6, the supply conveyor line 2 is arranged in a loop, and when a plurality of target sorting stations 1 are provided, the supply conveyor line 2 may be docked with each target sorting station to transfer the target source boxes 4 to the respective target sorting stations. The aforementioned sorting method further includes: after the target source box 4 is conveyed by the conveyor line from the external storage area to the corresponding sorting station to complete the sorting task, whether the target source box 4 has the sorting tasks of other sorting stations is determined; if so, the target source box 4 is conveyed into the supply conveyor line 2 for other corresponding target sorting stations 1 to sort, as such, a plurality of target sorting stations 1 can share one target source box 4, reducing the convey cost of the target source box 4, and improving the supply efficiency; if not, the sorting task of the source box 4 is ended, and the target source box 4 is conveyed to the outside. In some embodiments, the supply conveyor line 2 includes a main supply conveyor line 21 and a source box buffering line 22. The source box buffering line 22 is communicated with the main supply conveyor line 21, and the source box buffering line 22 is used for source box buffering to improve the source box supply efficiency to further improve the sorting efficiency.

In at least some embodiments, as shown in FIG. 5, the aforementioned target conveyor rail 131 is further provided with a guided vehicle buffering platform 131c. The sorting method further includes: when the target rail guided vehicle 132 needs to avoid other rail guided vehicles 132 during the travel of the conveyor rail 131, the target rail guided vehicle 132 is buffered at the guided vehicle buffering platform 131c.

Next, taking the process of sorting for a certain order task as an example, the process of sorting by taking an order line as a sorting unit in the aforementioned embodiment is specifically set forth:

When the control device receives order information including 5 No. 1 commodities, 18 No. 2 commodities and 8 No. 3 commodities, therefore, the order is split into 3 order lines: 5 No. 1 commodities, 18 No. 2 commodities and 8 No. 3 commodities. The three order line information is sent to one or more target sorting stations 1 corresponding thereto respectively, and one or more target rail guided vehicles 132; and the control device determines one or more target order containers 5 according to the 3 order line information (size, quantity, volume, material, etc.), and allocates the same delivery conveyor line 6 for the 3 order line information. The source boxes 4 (generally one order line commodity is stored in one source box 4) corresponding to the three order line target commodities 3 (5 No. 1 commodities, 18 No. 2 commodities and 8 No. 3 commodities) are conveyed to the source box locations 11 of the work tables 12 of one or more corresponding target sorting stations 1 via the supply conveyor lines 2.

The aforementioned one or more target sorting stations 1 display corresponding order line information, and an operator (a human being or robot) operates according to the display information of the target sorting station 1, and the target commodities 3 are sorted from the target source box 4 into the corresponding one or more target rail guided vehicles 132. The one or more target rail guided vehicles 132 convey the target commodities 3 born thereby to the corresponding delivery conveyor line 6, and the delivery conveyor line 6 conveys the target commodities 3 (5 No. 1 commodities, 18 No. 2 commodities and 8 No. 3 commodities) into the one or more target order containers 5 corresponding to the order to complete the order sorting.

After completing the order sorting, in some embodiments, as shown in FIG. 3, steps S301 and S302 are performed to determine whether the target source box 4 has a sorting task of other sorting stations 1; if so, the target source box 4 is output into the supply conveyor line 2 for conveying for sorting by other corresponding target sorting stations 1; if not, the sorting task of the target source box 4 is ended, and the target source box 4 is output to the outside.

Embodiment 2 Goods-to-Person Sorting System

As shown in FIGS. 4 to 6, the goods-to-person sorting system includes a supply conveyor line 2 (such as a roller conveyor) connected to an external storage area, one or more target sorting stations 1, one or more target rail guided vehicles 132, a conveyor rail 131 for the target rail guided vehicles 132 to travel, target order containers 5, and a control device (not shown). The control device communicates with the supply conveyor line 2, the target rail guided vehicle 132 and the target sorting station 1, respectively. The supply conveyor line 2 communicates with the target sorting station 1, and the target source box 4 is conveyed from an external storage area to the target sorting station 1 through the supply conveyor line 2 for sorting. The conveyor rail 131 is provided with a goods receiving position and a goods unloading position.

The target sorting station 1 is used to take the target commodities 3 from the target source box 4 and place the commodities onto the target rail guided vehicle 132, and the target sorting station also includes a worktable 12. The worktable 12 is used to provide a platform for an operator or robot or robot arm to sort. The height of the worktable 12 is typically set to an ergonomically convenient height for sorting or a height suitable for robot or robot arm operation. A source box location 11 for placing the target source box 4 is provided on the worktable 12. The target rail guided vehicle 132 has a goods receiving position 131a and a goods unloading position 131b provided on the conveyor rail 131, which is a bidirectional or four-way or four-way climbable rail guided vehicle 132 (bi-directional or four-way or four-way climbable rail guided vehicle 132 is well known in the art, and any suitable structure existing or developed in the future can be used according to disclosure of the present disclosure.) for bearing and transporting the target commodity 3.

In the goods-to-person sorting system, each target sorting station 1 is adjacent to the goods receiving position of the target rail guided vehicle 132. Each target sorting station 1 corresponds to one or more goods receiving positions. The target order containers 5 are adjacent the aforementioned goods unloading position and enables transfer of the target commodities 3 from the target rail guided vehicles 132 into the target order containers 5. The conveyor rail 131 includes a linear conveying section and/or an arc conveying section, along which the rail guided vehicle 132 can travel to reach its corresponding goods receiving position at each target sorting station 1 and its corresponding goods unloading position of each target order container 5. The target rail guided vehicles 132 can bear the target commodities 3 sorted from the target sorting station 1 when in the goods receiving position, and can unload the born target commodities 3 into the target order containers 5 when in the goods unloading position. A control device is used for acquiring order information and processing the order information into order line information, where the order line information includes a target commodity 3 corresponding to each of the order lines, a sorting quantity of the aforementioned target commodity 3 and a target source box 4 corresponding to the target commodity 3; according to each of the order line information, the control device is used for sending the order line information to the sorting station 1; and the control device is used for controlling the supply conveyor line 2, and the target rail guided vehicle 132 transporting the target commodity 3 into the corresponding target order container 5. The target order container 5 may be manually or robotically conveyed to the order container position or conveyed to the order container position via a conveyor line 7.

In some embodiments, the target sorting station 1 is further provided with a commodity information recognition device 14 electrically connected to the control device. The commodity information recognition device 14 is used for acquiring commodity information (such as commodity appearance, volume, weight, etc.). In the present embodiment, the commodity information recognition device 14 is a 3D image recognition device. A 3D image recognition device is arranged above the goods receiving position 131a of the target rail guided vehicle and is used for acquiring information about the appearance, volume, and image etc. of the goods and feeding same back to the control system to facilitate the control system to perform verification and prevent errors or deviations in the sorting operation.

In some embodiments, as shown in FIG. 5, the aforementioned sorting system further has a delivery conveyor line 6 which has a first end and a second end, where the first end is communicated with the conveyor rail 131, the second end is arranged above the entrance of the target order container 5; the aforementioned target commodities 3 are conveyed and transferred by the delivery conveyor line 6 into the target order container 5. In other embodiments, the delivery conveyor line 6 includes a plurality of order line conveyor lines 61; all order line commodities of an order correspond to one order line conveyor line 61, one order line conveyor line 61 corresponding to one or more target order containers 5. As such, an order line of an order can be sorted at different or the same target sorting stations 1, and then conveyed to an order line conveyor line by different or the same target rail guided vehicles 132; the target rail guided vehicle 132 can also receive target commodities of order lines of different orders from different or the same sorting station 1 and convey same to different order line conveyor lines 61; the dual sorting station 8 of the conventional art, as shown in FIG. 7, has to sort one by one in order of an order, causing a strong coupling problem, and the sorting system proposed by the present disclosure greatly reduces the coupling among a plurality of orders or a plurality of order lines, improving the sorting efficiency.

In some embodiments, the delivery conveyor line 6 includes an order line conveyor line 61 and a commodity buffering line 62. The order line conveyor line 61 is used for receiving the target commodity 3 unloaded from the target rail guided vehicle 132 and transferring the target commodity 3 into the target order container 5. The commodity buffering line 62 is of a semi-arc structure, and two ends of the semi-arc structure are both communicated with the main delivery conveyor line. Of course, the commodity buffering line 62 may have other structures and forms as long as the target commodity 3 can be buffered, and is not limited to the structure disclosed in the present disclosure.

In some embodiments, a tray flipping device 1321 is arranged at a top of the target rail guided vehicle 132. A tray flipping device 1321 has a horizontal goods receiving position and an inclined goods unloading position, the tray flipping device 1321 switches between the horizontal goods receiving position and the inclined goods unloading position to receive the target commodities 3 sorted from the sorting station 1 or to unload the target commodities 3 into the target order container 5 or the delivery conveyor line 6. The flipping direction of the tray flipping device 1321 is not limited in this patent and may be flipped forward or backward or both. It should be understood that the aforementioned tray flipping device 1321 is well known in the art, and any suitable structure existing or developed in the future can be used according to disclosure of the present disclosure. Of course, the target rail guided vehicle 132 may have other structures and forms as long as it can bear and unload goods, and is not limited to the structure disclosed by the present disclosure.

In some embodiments, as shown in FIG. 5, the aforementioned conveyor rail 131 is further provided with a rail guided vehicle buffering platform 131c for buffering the target rail guided vehicle 132. When the target rail guided vehicle 132 carrying the target commodity 3 needs to avoid other target rail guided vehicle 132 during the travel of the conveyor rail 131, the target rail guided vehicle 132 carrying the target commodity 3 is buffered at the guided vehicle buffering platform 131c. In addition, it should be noted that since the target rail guided vehicle 132 can travel along the conveyor rail 131 to reach its goods receiving position corresponding to each target sorting station 1 and its goods unloading position corresponding to each target order container 5, namely, the target rail guided vehicle 132 can receive commodities from the goods receiving positions of different target sorting stations 1 and convey these commodities to the target order containers 5 or different target order containers 5.

In some embodiments, as shown in FIG. 6, the supply conveyor line 2 is arranged in a loop, and when a plurality of target sorting stations 1 are provided, the supply conveyor line 2 may be docked with each target sorting station 1 to transfer the target source boxes 6 to the respective target sorting stations 1. In other embodiments, the supply conveyor line 2 includes a main supply conveyor line 21 and a source box buffering line 22. The source box buffering line 22 is communicated with the main supply conveyor line 21, and the source box buffering line 22 is used for source box 4 buffering to improve the source box supply efficiency to further improve the sorting efficiency.

The sorting principle of the sorting system is as described above for the aforementioned sorting method and will not be described again here.

It should be understood that all combinations of the aforementioned concepts and additional concepts described in greater detail below can be considered as part of the inventive subject matter of the present disclosure unless such concepts are mutually inconsistent. Additionally, all combinations of subject matter claimed to be protected are considered part of the inventive subject matter of the present disclosure.

Although the present disclosure has been described with reference to preferred embodiments, it is not intended to be limited thereto. A person skilled in the art can make various changes and modifications without departing from the spirit and scope of the present disclosure. Accordingly, the protection scope of the present disclosure should be defined by the appended claims.

What is claimed is:

1. A sorting method applied to a goods-to-person sorting system having a supply conveyor line connected to an external storage area, and at least one target sorting station, wherein the sorting method comprises:
acquiring order information and splitting the order information into a plurality of order line information, each of the order line information including a target commodity, a target sorting quantity and a target source box corresponding to an order line, and each of the order lines including one or more types of target commodities as well as a target sorting quantity and a target source box of each of the target commodities;

matching a target sorting station, a target rail guided vehicle and a target order container corresponding to each of the order lines according to each of the order line information; and configuring the target source box to be conveyed to the corresponding target sorting station from the external storage area by using the supply conveyor line; and configuring the target commodities to be sorted to the target rail guided vehicle from the target source box; and configuring the target commodities to be conveyed and transferred into the target order container by using the target rail guided vehicle;

wherein the goods-to-person sorting system comprises at least one target rail guided vehicle, a target conveyor rail on which each of the target rail guided vehicles travels, and at least one target order container.

2. The sorting method according to claim 1, wherein the order information is matched to the order line information by taking the target commodity as a basis for determination, and one or more order information is acquired according to batches and split into order line information.

3. The sorting method according to claim 2, wherein when the order information is split, a certain target commodity quantity of the current order line information is acquired;

whether the current target commodity quantity of the order line information exceeds the target commodity quantity in the target source box is determined;

if so, target commodity-related information is split into new order line information; and if not, the target commodity-related information is added to the order line information.

4. The sorting method according to claim 1, wherein when the supply conveyor line is annularly arranged, and a plurality of target sorting stations are arranged, after each order line completes a sorting task of the target sorting station thereof, whether the target source box has the sorting task of other target sorting stations is determined;

if so, the target source box is output into the supply conveyor line for conveying for other corresponding target sorting stations to sort; and if not, the sorting task of the target source box is ended.

5. The sorting method according to claim 1, wherein the goods-to-person sorting system is further configured with a delivery conveyor line, the target commodity is conveyed and transferred into the target order container by the target rail guided vehicle, and the steps of conveying and transferring comprise:

conveying and transferring the target commodity to the delivery conveyor line by the target rail guided vehicle; and conveying and transferring the target commodity into the target order container by the delivery conveyor line.

6. The sorting method according to claim 5, wherein the target commodities of all order lines of each of the order information correspond to one order line conveyor line; wherein a plurality of order line conveyor lines are configured on the delivery conveyor line in parallel, and the corresponding order line conveyor lines are determined according to order information; and each of the order line conveyor lines corresponds to one or more order containers, and the one or more order containers corresponding to each of the order lines are determined according to each of the order line information.

7. The sorting method according to claim 1, wherein when the target rail guided vehicle needs to avoid other rail guided vehicles during traveling on the conveyor rail, the target rail guided vehicle is buffered by a guided vehicle buffering platform, and the guided vehicle buffering platform is arranged on the conveyor rail.

8. A goods-to-person sorting system, comprising a supply conveyor line connected to an external storage area, at least one target sorting station, at least one target order container, and a control device, wherein the goods-to-person sorting system further comprises:

at least one target rail guided vehicle, the target rail guided vehicle being configured with a target conveyor rail on which the target rail guided vehicle travels, and the target conveyor rail being provided with a goods receiving position and a goods unloading position, and the target rail guided vehicle being used for bearing target commodities sorted from the sorting station at the goods receiving position and also used for unloading the borne target commodities into the target order container at the goods unloading position; and a target source box, the target source box being used for being conveyed to the sorting station for sorting from the external storage area through the supply conveyor line, and the supply conveyor line being communicated with the sorting station;

wherein the control device is used for acquiring order information and processing the order information into order line information, the control device is used for determining a target rail guided vehicle, a target sorting station and a target order container corresponding to each of the target source boxes according to each of the order line information, the control device is also used for sending the order line information to the target sorting station, and the control device is used for controlling the supply conveyor line and the target rail guided vehicle to transport the target commodities into the corresponding target order container; and each of the order line information comprises a target commodity, a target sorting quantity and a target source box corresponding to an order line, and each of the order lines comprises one or more types of target commodities and a target sorting quantity and a target source box of each of the target commodities.

9. The goods-to-person sorting system according to claim 8, wherein the goods-to-person sorting system further has a delivery conveyor line; and the delivery conveyor line has a first end communicated with a conveyor rail of the target rail guided vehicle, the delivery conveyor line further has a second end arranged above an inlet of the target order container, and the delivery conveyor line is used for conveying and transferring the target commodity into the target order container by the target rail guided vehicle corresponding to the target commodity.

10. The goods-to-person sorting system according to claim 9, wherein the delivery conveyor line comprises a plurality of order line conveyor lines arranged in parallel; and commodities of all order lines of one order correspond to one of the order line conveyor lines, and each of the order line conveyor lines is configured with one or more order containers.

11. The goods-to-person sorting system according to claim 9, wherein the delivery conveyor line comprises a main delivery conveyor line and a commodity buffering line;
  the main delivery conveyor line is used for receiving the target commodity unloaded by the target rail guided vehicle, and conveying the target commodity into the target order container; and
  the commodity buffering line is of an arc-shaped structure, and two ends of the arc-shaped structure are both communicated with the main delivery conveyor line.

12. The goods-to-person sorting system according to claim 8, wherein a tray flipping device is arranged at a top of the target rail guided vehicle; and
  the tray flipping device has a horizontal goods receiving position and an inclined goods unloading position, and the tray flipping device is switched between the horizontal goods receiving position and the inclined unloading position to receive the target commodity sorted from the sorting station or unload the target commodity into the target order container or delivery conveyor line.

13. The goods-to-person sorting system according to claim 9, wherein the target sorting station is further provided with a commodity information recognition device electrically connected to the control device.

\* \* \* \* \*